US005858038A

United States Patent [19]

Dyson et al.

[11] Patent Number: 5,858,038

[45] Date of Patent: Jan. 12, 1999

[54] DUST SEPARATION APPARATUS

[75] Inventors: James Dyson, Bathford; Andrew Walter McRae Thomson; Simon Mark Bickerstaff, both of Malmesbury, all of United Kingdom

[73] Assignee: Notetry Limited, Little Somerford, United Kingdom

[21] Appl. No.: 850,000

[22] PCT Filed: Dec. 20, 1995

[86] PCT No.: PCT/GB95/02987

§ 371 Date: Aug. 11, 1997

§ 102(e) Date: Aug. 11, 1997

[87] PCT Pub. No.: WO96/19294

PCT Pub. Date: Jun. 27, 1996

[30] Foreign Application Priority Data

| | | | |
|---|---|---|---|
| Dec. 21, 1994 | [GB] | United Kingdom | 9425812 |
| Mar. 7, 1995 | [GB] | United Kingdom | 9504504 |

[51] Int. Cl.[6] ..................... B01D 45/12

[52] U.S. Cl. ..................... 55/337; 55/345; 55/429; 55/459.1; 55/DIG. 2; 55/DIG. 3

[58] Field of Search ..................... 55/337, 345, 429, 55/459.1, DIG. 2, DIG. 3

[56] References Cited

U.S. PATENT DOCUMENTS

| | | | |
|---|---|---|---|
| 3,802,570 | 4/1974 | Dehne . | |
| 4,826,515 | 5/1989 | Dyson . | |
| 4,853,008 | 8/1989 | Dyson | 55/429 |
| 5,062,870 | 11/1991 | Dyson | 55/429 |
| 5,078,761 | 1/1992 | Dyson | 55/429 |
| 5,090,976 | 2/1992 | Dyson . | |
| 5,123,945 | 6/1992 | Lin | 55/429 |
| 5,145,499 | 9/1992 | Dyson | 55/429 |
| 5,160,356 | 11/1992 | Dyson | 55/429 |
| 5,248,858 | 9/1993 | Lin | 55/429 |
| 5,267,371 | 12/1993 | Soler et al. | 55/429 |

FOREIGN PATENT DOCUMENTS

| | | |
|---|---|---|
| 0068792 A2 | 1/1983 | European Pat. Off. . |
| 0313197 A3 | 4/1989 | European Pat. Off. . |
| 0447887 A1 | 9/1991 | European Pat. Off. . |
| 732840 | 6/1955 | United Kingdom . |
| 1397863 | 6/1975 | United Kingdom . |
| 2199267 | 7/1988 | United Kingdom . |
| WO695347 | 8/1953 | WIPO . |
| WO92/17278 A1 | 10/1992 | WIPO . |

*Primary Examiner*—Jay H. Woo
*Assistant Examiner*—Minh-Chau T. Pham
*Attorney, Agent, or Firm*—Ian C. Mcleod

[57] ABSTRACT

An apparatus (10) for separating dirt or dust from an airflow comprising a frustoconical cyclone (12) having a tangential air inlet (16) located at or adjacent the end of the cyclone (12) having the larger diameter and a cone opening (18) located at the end of the cyclone (12) having the smaller diameter is described. A collector (20) is arranged so as to surround the cone opening (18) and has a base surface (24) facing towards the cone opening (18). The distance between the cone opening (18) and the base surface (24) is between 4 and 6 mm or between 45 and 60 mm. The apparatus (10) is reduced in size without substantially affecting the separation efficiency.

24 Claims, 4 Drawing Sheets

DUST SEPARATION APPARATUS

BACKGROUND OF THE INVENTION

1. Field of the Invention

The invention relates to apparatus for separating dirt or dust particles from an airflow by cyclonic means. The invention relates particularly, but not exclusively, to cyclonic dust separation apparatus for use in a vacuum cleaner.

2. Description of Related Art

Cyclonic dust separation apparatus typically comprises a frusto-conical cyclone having a tangential air inlet at the end having the larger diameter and a cone opening leading to a dirt or dust collector at the end having the smaller diameter. The dust collector is generally cylindrical in shape and is considerably larger in diameter than the cone opening, normally having a diameter of at least three times that of the cone opening. In operation, an airflow carrying dirt and dust with it enters the cyclone via the air inlet and, by virtue of the tangential orientation of the air inlet, is set into a swirling motion over the interior surface of the cyclone. Most of the air of the airflow escapes from the cyclone by passing towards the longitudinal axis of the cyclone and exiting via an exit passage arranged substantially centrally of the end of the cyclone having the larger diameter. The remainder of the airflow spirals towards the cone opening at increasing angular speeds carrying the dirt and dust with it and is ejected into the dust collector, whereupon the dirt and dust particles are flung towards the cylindrical wall of the collector. The dirt and dust particles then collect in the lower regions of the cylindrical wall, whilst the remainder of the airflow exits from the collector via the cone opening and the exit passage. Apparatus of this type is illustrated and described in U.S. Pat. No. 5,090,976.

It is generally desirable for cyclonic dust separation apparatus to be relatively compact, particularly as regards the overall length of the apparatus, ie, the dimension parallel to the longitudinal axis of the cyclone. If the apparatus is used in a vacuum cleaner, compact dust separation apparatus reduces the overall dimensions of the complete cleaner and lowers the centre of gravity of the cleaner which, in turn, increases its stability. This is particularly advantageous in cylinder-type cleaners as well as upright-type vacuum cleaners.

OBJECTS

It is an object of the present invention to provide dust separation apparatus which is relatively compact without any significant loss of dust separation efficiency.

SUMMARY OF THE INVENTION

According to the invention, there is provided apparatus for separating dirt or dust from an airflow comprising a frustoconical cyclone having a tangential air inlet located at or adjacent the end of the cyclone having the larger diameter and a cone opening located at the end of the cyclone having a smaller diameter than at the end having the larger diameter, and a collector arranged so as to surround the cone opening and having a base surface facing towards the cone opening and upwardly ending wall, wherein the distance between the cone opening and the base surface is either between 4 and 6 mm or between 45 and 60 mm. Advantageous features are set out in the subsidiary claims.

It has previously been assumed that as large a distance as possible between the base surface and the cone opening is desirable. This allows more volume in the collector for separated dirt and dust to accumulate before emptying is required and was also thought to reduce the likelihood of separated dirt and dust becoming re-entrained into the airflow. The distance between the base surface and the cone opening has therefore been limited merely by the desired overall dimensions of the machine of which the dust separation apparatus forms part. However, it has now been found that varying this distance can affect the separation efficiency of the apparatus. Maxima of separation efficiency for different sizes of cyclone and collector occur when the distance between the base surface and the cone opening lies in the range 30 mm to 70 mm. A particularly advantageous distance is 54 mm. Surprisingly, a distance of less than 8 mm, particularly around 4 mm to 6 mm, is highly efficient even though it was initially thought that such a small distance would adversely affect the airflow in the cyclone and collector. Reducing the distance between the base surface and the cone opening to 8 mm or less therefore has an additionally advantageous effect on the overall dimensions of the apparatus without substantially detracting from the separation efficiency thereof. The centre of gravity of the separation apparatus is therefore lowered.

BRIEF DESCRIPTION OF THE DRAWINGS

Embodiments of the invention will now be described with reference to the accompanying drawings, wherein.

DESCRIPTION OF PREFERRED EMBODIMENTS

Figure 1A:
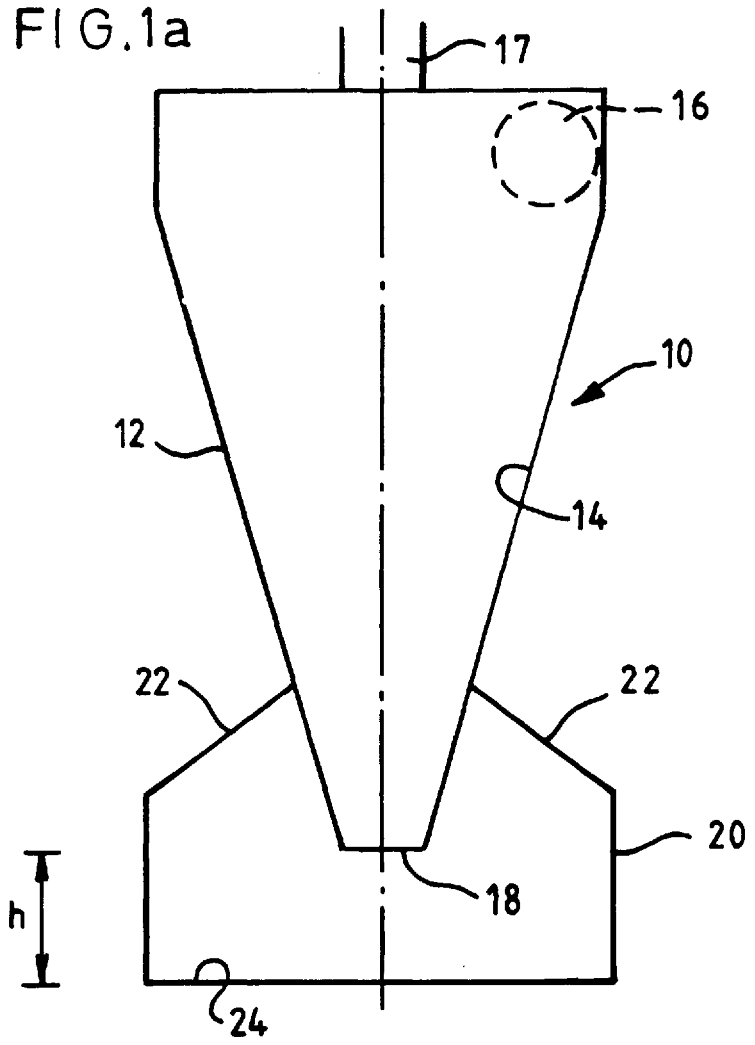
FIG. 1*a* is a sectional side view of a first embodiment of apparatus for separating dirt or dust from an airflow according to the invention.

FIG. 1*a* shows apparatus 10 for separating dirt or dust from an airflow consisting of a frustoconical cyclone 12 having an interior surface 14. An air inlet 16 is arranged at the end of the cyclone 12 having the larger diameter and the air inlet 16 communicates with the cyclone 12 so as to introduce air tangentially into the cyclone 12.

At the end of the cyclone 12 having the smaller diameter, ie. remote from the air inlet 16, there is a cone opening 18. Surrounding the cone opening 18 and sealed against the outer walls of the cyclone 12 is a collector 20 for collecting dirt and dust separated from the airflow. The main body of the collector 20 is generally cylindrical in shape although inclined walls 22 extend between the generally cylindrical portion and the cyclone 12. The collector 20 has a base surface 24 facing towards the cone opening 18, ie. remote from the main body of the cyclone 12.

In use, an airflow consisting of a stream of air having dirt and dust particles entrained therein enters the cyclone 12 via the inlet 16. Because of the tangential entry arrangement, the dirt-laden airflow takes up a swirling motion inside the cyclone 12 and spirals over the interior surface 14 of the cyclone 12 towards the cone opening 18 at ever-increasing angular speeds, with clean air escaping from the cyclone 12 by moving inwardly towards the longitudinal axis and upwardly towards an exit port 17. As soon as the remainder of the airflow enters the collector 20 via the cone opening 18, the dirt and dust particles entrained within the airflow are flung towards the side walls of the collector 20. The airflow, which is substantially free of dirt and dust particles, then exits the collector 20 via the cone opening 18 and leaves the cyclone 12 by means of the exit port 17 located substantially centrally of the end of the cyclone 12 having the larger diameter.

It has been found that, by varying the distance h between the base surface 24 and the cone opening 18, that the separation efficiency of the apparatus 10 can be improved. When the distance h is set at a value of between 30 mm and 70 mm, the separation efficiency increases. In particular, there is a peak in separation efficiency when the distance h is set at substantially 54 mm.

Figure 1B:
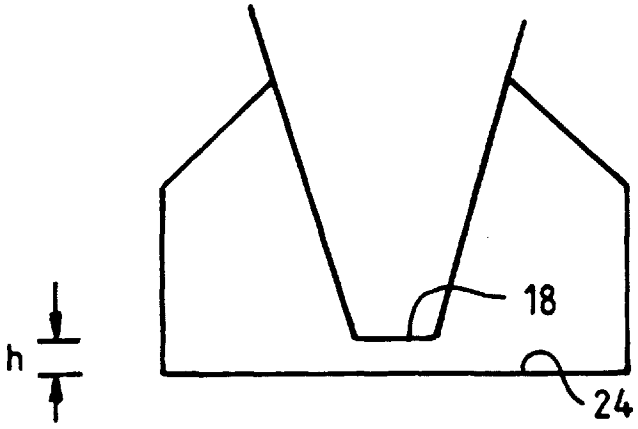
FIG. 1*b* is a sectional side view, corresponding to part of FIG. 1*a*, of a second embodiment of the invention.

It has also been found that the separation efficiency is particularly good if the distance h is reduced to less than 10 mm. This is extremely surprising because it has previously been anticipated that such a small gap between the cone opening 18 and the base surface 24 would either restrict the airflow through the dirt or dust separation apparatus 10 or increase the likelihood of separated dirt or dust becoming re-entrained within the airflow. Tests have shown that this is not the case and that there is a particularly good separation efficiency when the distance h is between 4 mm and 6 mm. This arrangement is illustrated in FIG. 1*b*.

Figure 2:
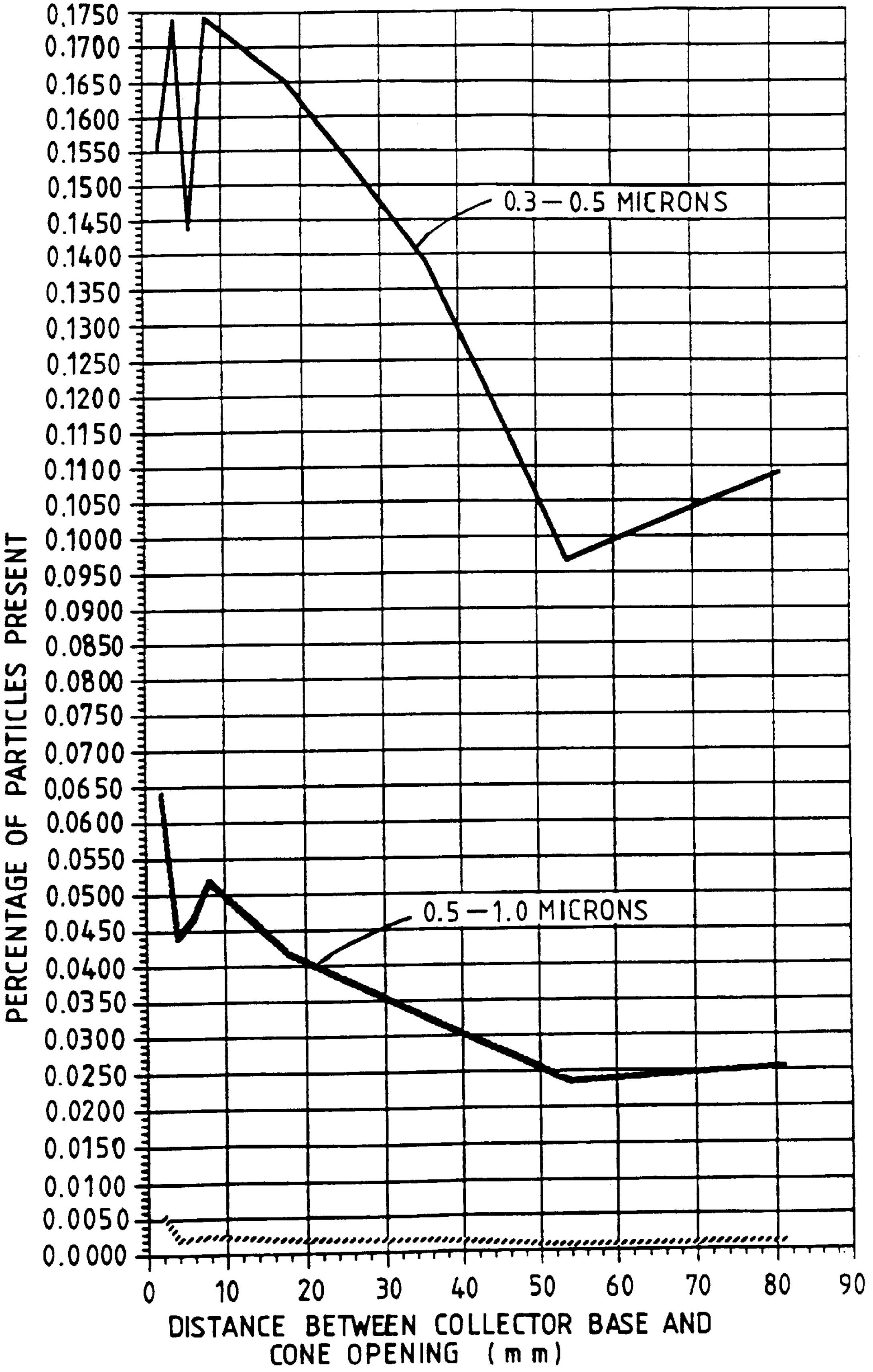
FIG. 2 is a graph showing filtration efficiency test results for a 260 mm cyclone with a flat-bottomed fine dust collector at varying distances from the cone opening.

Test results showing the variation in separation efficiency for different distances between the base surface 24 and the cone opening 18 are shown in FIG. 2. The tests were carried out on apparatus incorporating a 260 mm cone and a flat-bottomed collector positioned at varying distances from the cone opening. The upper line shows the percentage of particles falling in the range 0.3–0.5 μm present in the airflow after a standard test time, and the lower line shows the percentage of particles falling in the range 0.5–1.0 μm present after the standard test time. Clear minima can be seen at distances of 4 mm–6 mm and 54 mm.

Figure 3A:
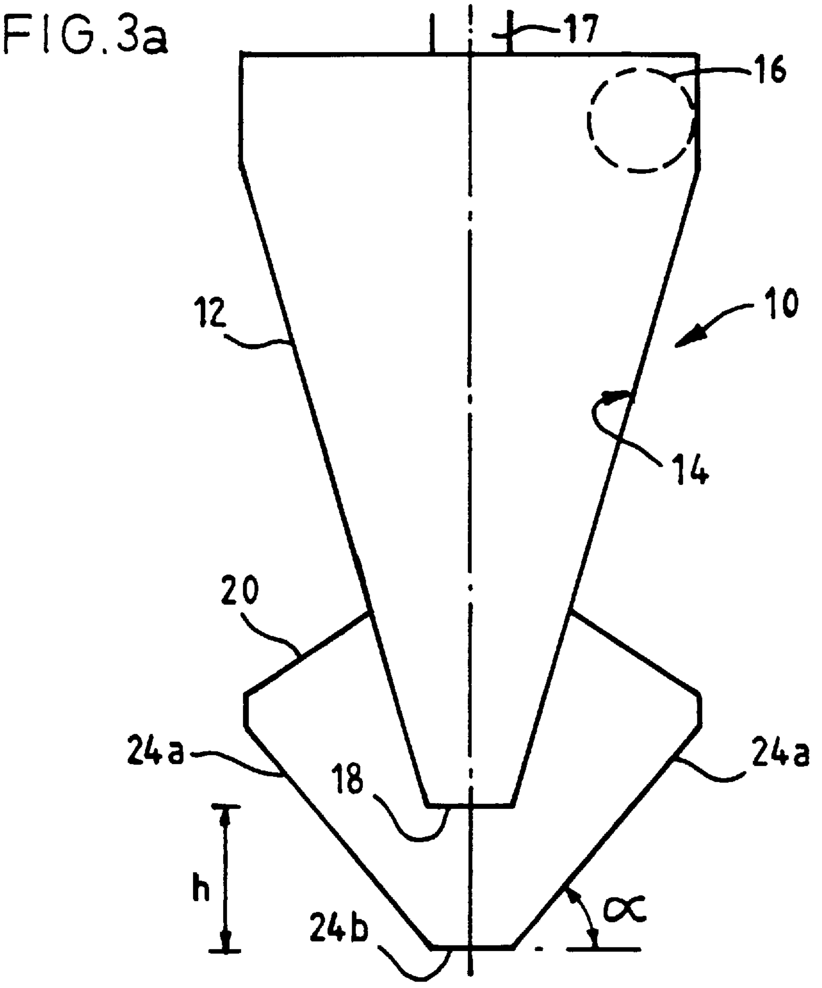
FIG. 3*a* is a sectional side view of a third embodiment of the invention.
Figure 3B:
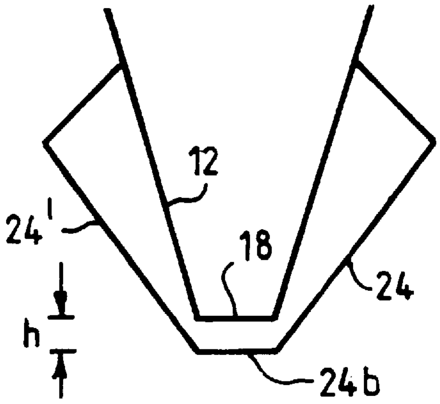
FIGS. 3*b* and 3*c* are sectional side views, corresponding to part of FIG. 3*a*, of fourth and fifth embodiments respectively of the invention.
Figure 3C:
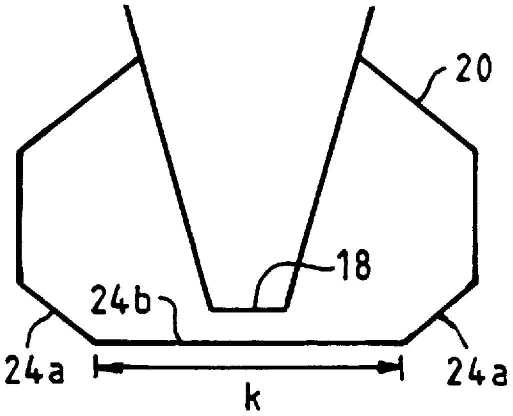

FIGS. 3*a*, 3*b* and 3*c* illustrate alternative embodiments of the first aspect of the invention. The apparatus shown in FIG. 3*a* corresponds closely to the apparatus shown in FIG. 1*a*. The only difference between the apparatus shown in FIGS. 1*a* and 3*a* is the shape of the collector 20. In FIG. 3*a*, the planar base surface 24 is replaced by a base surface 24' consisting of a frustoconical portion 24*a* surrounding a planar circular portion 24*b*. (The cylindrical portions of the collector 20 shown in FIG. 1*a* have also been reduced in height.) The result is that the collector 20 shown in FIG. 3*a* is substantially frustoconical in shape. This allows the entire apparatus 10 to be rotated about an axis running along any diameter of the central portion 24*b* so as to tilt the apparatus 10 with respect to a fixed surface parallel to that axis.

It had previously been expected that dirt and dust separated from the airflow on entry into the collector 20 via the cone opening 18 would travel down the inclined surfaces 24*a* of the collector 20 and accumulate in the region of the central portion 24*b*. It was thought that such an accumulation would result in the separated dirt and dust being re-entrained into the airflow. However, tests have shown that this re-entrainment does not occur.

In the embodiment shown in FIG. 3*a*, the distance between the cone opening 18 and the central portion 24*b* of the base surface 24' is substantially 54 mm. Furthermore, the angle of inclination α of the frusto-conical portion 24*a* with respect to the central portion 24*b* is substantially 50°. Also, the diameter of the central portion 24*b* is substantially identical to the diameter of the cone opening 18 and this is preferably substantially 25 mm.

Various modifications and variations are possible within the context of this aspect of the invention: the distance between the cone opening 18 and the central portion 24*b* of the base surface 24' can be varied and, in particular, can be reduced to a distance of substantially 7 mm. This spacing gives an increased separation efficiency. Such an arrangement is illustrated in FIG. 3*b*.

A further alternative arrangement is illustrated in FIG. 3*c* which shows the collector 20 having a frustoconical portion 24*a* and a central circular portion 24*b*, but wherein the central circular portion 24*b* has a diameter k which is substantially larger than that of the cone opening 18. In the embodiment shown in FIG. 3*c*, the diameter of the cone opening 18 is substantially 25 mm, whereas the diameter of the circular central portion 24*b* is substantially 125 mm.

Figure 4A:
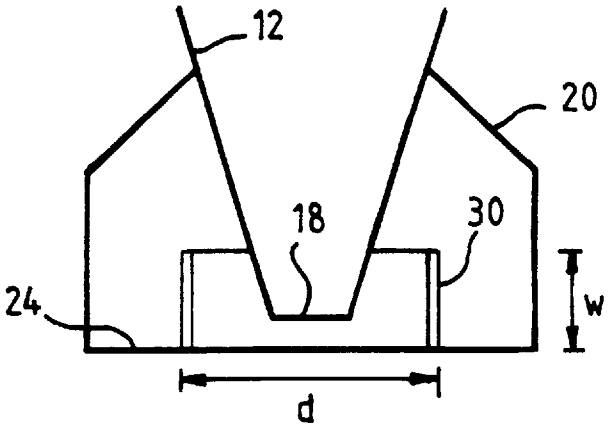
FIG. 4*a* is a sectional side view, corresponding to FIG. 1*b*, of a sixth embodiment of the invention.
Figure 4B:
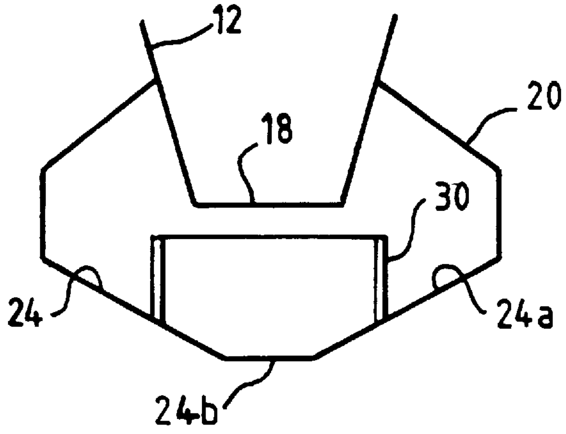
FIG. 4*b* is a sectional side view, corresponding generally to FIGS. 3*b* and 3*c*, of a seventh embodiment of the invention.

FIGS. 4*a* and 4*b* illustrate an additional measure designed to reduce any possibility of dirt and dust collected in the collector 20 becoming re-entrained in the airflow circulating in the apparatus 10. This measure applies primarily in cases wherein the distance between the cone opening 18 and the base surface 24 is less than 8 mm or wherein the base surface 24 is conical or frusto-conical in shape.

In order to reduce still further the possibility of dirt and dust located in the collector 20 from being re-entrained into the airflow, dirt and dust-retaining means in the form of a wall 30 are provided on the base surface 24. The wall 30 is upwardly extending with respect to the base surface 24 and is substantially annular in shape, although other plan shapes could be utilised. The diameter d of the annular wall 30 is substantially 70 mm but this could be varied within the range 30 mm to 100 mm. The height w of the wall 30 is substantially 55 mm from the junction between the wall 30 and the base surface 24 but could be varied within the range 20 mm to 60 mm.

The wall 30 has a tapering cross-section as shown in FIG. 4*a*. The thickness of the wall 30 is greater at the end thereof adjacent the junction with the base surface 24 than at the distal end. The upper end of the wall 30 is radiused to form a smooth finish.

When the annular wall 30 is provided in conjunction with a frustoconical base surface 24 as shown in FIG. 4*b*, the junction between the wall 30 and the base surface 24 is on the frustoconical portion 24*a* of the base surface 24. However, if the central portion 24*b* is sufficiently large in diameter, the junction between the wall 30 and the base surface 24 can occur in the central planar portion 24*b*.

In operation, air exiting the cyclone 12 via the cone opening 18 causes dirt and dust particles entrained therein to be flung against the outer walls of the collector 20. The annular wall 30 prevents the dirt and dust particles from travelling towards the central portion of the base surface 24 and thereby reduces the possibility of dirt and dust particles becoming re-entrained into the airflow.

It is envisaged that cyclonic dust separation apparatus as described above can be used to advantage in a number of different situations. The application to which it is envisaged that the present invention is most likely to be applied is that of vacuum cleaning apparatus. Either of the aspects of the invention described above can be used in an upright or cylinder-type vacuum cleaner in order to lower the centre of gravity and/or reduce the size of the apparatus as a whole. It is also likely that the apparatus described above will be used in conjunction with further cyclonic dust separation apparatus specifically designed to remove larger dust and fluff particles in a so-called "low efficiency" cyclone. The apparatus described above will therefore be intended to remove only the finer particles of dirt and dust entrained in the airflow.

However, it is also envisaged that the invention described above may well be utilised in other situations, for example the removal or dirt and dust particles from internal combustion engine emissions. The principles described above are equally applicable to such situations and need not be used in combination with further cyclonic separation apparatus unless it is so desired.

We claim:

1. Vacuum cleaner apparatus for separating dirt or dust from an airflow comprising a frustoconical cyclone having a tangential air inlet located at or adjacent the end of the cyclone having the larger diameter and a cone opening located at the end of the cyclone having a smaller diameter than at the end having the larger diameter, and a collector arranged so as to surround the cone opening and having a base surface facing towards the cone opening, wherein the distance between the cone opening and the base surface is either less than 8 mm or between 30 mm and 70 mm such that there is improved separation of the dirt or dust because of the distance in the apparatus.

2. Apparatus as claimed in claim 1, wherein the base surface is substantially planar.

3. Apparatus as claimed in claim 2, wherein the distance between the cone opening and the base surface is measured parallel to a longitudinal axis between the ends of the cyclone.

4. Apparatus as claimed in claim 3, wherein the distance between the cone opening and the base surface is between 4 mm and 6 mm.

5. Apparatus as claimed in claim 3, wherein the distance between the cone opening and the base surface is between 45 mm and 60 mm.

6. Apparatus as claimed in claim 5, wherein the distance between the cone opening and the base surface is 54 mm.

7. Apparatus as claimed in any one of claims 3, 4, 5 or 6, wherein the base surface has a diameter which is spaced around a longitudinal axis of the cyclone.

8. Apparatus as claimed in claim 7, wherein the an upwardly-extending wall is annular.

9. Apparatus as claimed in claim 8, wherein an upwardly extending wall extends upwardly from the base surface for between 10 mm and 60 mm.

10. Apparatus as claimed in claim 9, wherein the wall extends upwardly from the base surface for 55 mm.

11. Apparatus as claimed in any one of claims 3, 4, 5 or 6, wherein the base surface has a diameter spaced around the longitudinal axis of the cyclone and wherein the diameter of the wall is between 30 mm and 100 mm.

12. Apparatus as claimed in claim 11, wherein the diameter of the wall is 70 mm.

13. Apparatus as claimed in any one of claims 3, 4, 5 or 6, wherein the base surface has a diameter spaced around the longitudinal axis of the cyclone with an upwardly extending annular wall from the base surface wherein a diameter of the wall is greater at an end adjacent the base surface than at an end remote therefrom.

14. Apparatus as claimed in any one of claims 3, 4, 5 or 6, wherein the base surface is spaced around the longitudinal axis of the cyclone with an upwardly extending annular wall from the base surface wherein the end of the wall remote from the base surface is radiused.

15. Apparatus as claimed in any one of claims 3, 4, 5 or 6, wherein the base surface has a diameter spaced around the longitudinal axis of the cyclone with an upwardly extending annular wall from the base surface wherein at least a portion of the annular wall is conical or frustoconical in shape.

16. Apparatus as claimed in claim 15, wherein the collector comprises a frustoconical portion as the wall and a circular portion as the base portion.

17. Apparatus as claimed in claim 16, wherein the diameter of the circular portion is the same as that of the cone opening.

18. Apparatus as claimed in claim 16 or 17, wherein the diameter of the circular portion is between 20 mm and 30 mm.

19. Apparatus as claimed in claim 16, wherein the diameter of the circular portion is 25 mm.

20. Apparatus as claimed in claim 16, wherein the diameter of the circular portion is greater than a diameter of the cone opening.

21. Apparatus as claimed in claim 20, wherein the diameter of the circular portion is 125 mm.

22. Apparatus as claimed in claim 16, wherein the circular portion is planar.

23. Apparatus as claimed in claim 15, wherein the conical or frusto-conical portion of the collector is inclined at an angle of between 30° and 50° to the longitudinal axis of the cyclone.

24. Apparatus as claimed in claim 23, wherein the conical or frusto-conical portion of the base surface is inclined at an angle of 40° to the longitudinal axis of the cyclone.

* * * * *